June 11, 1957     J. J. TOPOLINSKI     2,795,247
REVERSIBLE CIRCULAR SAW
Filed July 7, 1954
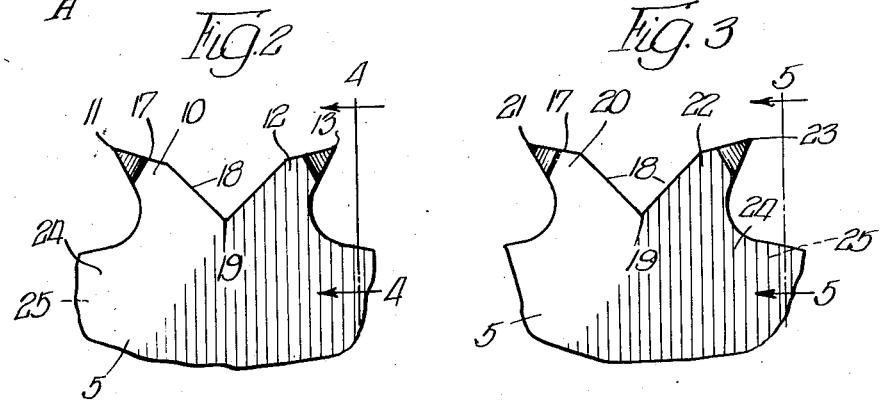
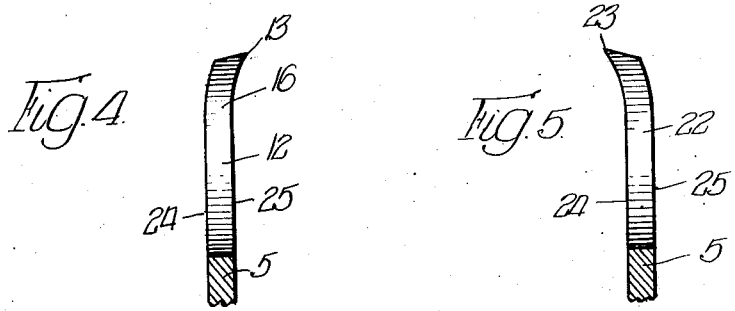
INVENTOR.
Jerome J. Topolinski

United States Patent Office 2,795,247
Patented June 11, 1957

2,795,247

REVERSIBLE CIRCULAR SAW

Jerome J. Topolinski, Lincolnwood, Ill., assignor to Skil Corporation, Chicago, Ill., a corporation of Delaware Application July 7, 1954, Serial No. 441,796

2 Claims. (Cl. 143—133)

This invention relates to saws and more particularly to circular saws for cutting wood, metals and the like.

One object of the present invention is to provide a more economical saw that will have a longer cutting life before replacement.

A further object is to provide a saw that can be manufactured less expensively than those on the market today and provide more economical operation to the consumer.

Another object of the invention is to provide a saw that may be reversed from time to time for cutting in opposite directions thereby providing longer life for the saw.

A still further object of the present invention is to provide a saw blade that is safer in operation, and has less grab and kick-back.

Other objects will become apparent to those skilled in the art in the course of studying the following specification.

In the drawings:

Fig. 1 is a view in side elevation of a saw embodying the invention; a portion being broken away.

Fig. 2 is a view of a first pair of saw teeth enlarged over those shown in Fig. 1.

Fig. 3 is a view similar to Fig. 2 of an alternate pair of saw teeth.

Fig. 4 is a view taken on line 4—4 of Fig. 2, and

Fig. 5 is a view taken on line 5—5 of Fig. 3.

Heretofore in the manufacture of saw blades, circular blades have been made with the cutting teeth facing in the same direction so that continuous cutting might be had in that direction until the teeth become dulled and require sharpening. Similarly in band saws the teeth have been formed in one direction for continuous cutting. In timber and wood cutting saws the teeth have been formed with vertically sharpened cutting edges with various raker teeth inserted therebetween so that the blades, where reciprocated by hand or power in the work piece, might cut in both directions of the saw.

In some of the frame saw art, two-way saw blades were used wherein the teeth faced in one direction for half the length of the blade and in the opposite direction for the remaining length of the blade. These power driven reciprocating blades cut only during one half the length of reciprocation in either direction. Other frame saws have the teeth facing in one direction only and cut along the entire length of the blade, have a non-cutting return stroke and again are returned for cutting action.

The present invention contemplates a saw blade that is reversible in its mounting so that it cannot be improperly positioned on a machine even by an inexperienced or careless operator. To effect this, alternate cutting teeth are arranged on the blade facing in opposite directions. More particularly a plurality of pairs of teeth comprising a leading tooth and a trailing tooth are preferably formed around the rim of the blade in back to back relationship having their respective cutting points facing in opposite or reversed directions. Each pair of cutting teeth faces opposed cutting teeth and, since only one tooth of each pair is adapted to cut in any one direction of blade movement, each pair has a leading cutting tooth and a trailing tooth regardless of direction of cut. Tests of blades embodying the present invention indicate close co-action not only between the teeth of each pair, but between pairs of adjoining teeth as will be pointed out more completely hereinafter.

With reference to the drawings, a suitable blank is stamped, milled or otherwise worked to form a plurality of pairs of teeth 10 and 12 alternating with a plurality of pairs of teeth 20 and 22 around the perimeter of the body portion 5 of the blade.

Tooth 10 of the first pair of teeth is formed with a cutting point 11 while tooth 12 of that pair has a cutting point 13 formed on its end with these cutting points facing in opposite directions. In clockwise rotation of the blade, tooth 12 would be the leading tooth and tooth 10 the trailing one.

Behind each cutting point, the teeth are relieved by a topping or rear edge 17 to prevent drag and friction behind the cutting points and these topping edges are joined by further more drastically relieved non-cutting portions 18 forming the joined backs of the paired teeth.

Each tooth has a forward cutting edge 16 below its cutting point which extends downwardly into a gullet portion 15 formed between pairs of facing teeth. As may be seen the cutting points of the teeth may over-lie or overhang the gullet portions 15 between opposed teeth. The cutting points on the teeth of each pair are set in the same direction. For instance, the teeth 10 and 12 of the first pair may have their cutting points 11 and 13 set out of the plane of the body portion 5 toward the side 25 of the blade (Figs. 4, 5). Thus if the blade of Fig. 1 is traveling in a clockwise direction, tooth 12 will be cutting and tooth 10 may follow or trail directly behind through the path cut by the cutting point 13 without undue dragging or friction, since its cutting point 11 is set toward the same side. Preferably alternate pairs of teeth are set in opposite directions so that teeth 20 and 22 of the next pair will have their cutting edges 21 and 23, respectively, set in the direction of side 24 of the body portion and opposite to the set of teeth 10, 12. This opposite setting of alternate pairs affords clearance for the blade while reducing any tendency for friction.

The blade may be made from alloy steel as is customary in saw blades today to give longer lasting cutting edges and points. The teeth throughout the perimeter of the blade are preferably hardened beyond the bottom of the gullet portions 15 and possibly beyond th junction 19 of tooth backs 18 to give longer life to the cutting points and edges.

This hardening may be substantially on a radius of the blade that will form a circle indicated as dotted line A—A, Fig. 1. Any stresses set up in the body portion 5 from heat or other forces during a cutting operation will find relief through the gullet portions 15 and the junction 19 of the back edges 18. Were the hardening carried below the gullet bottoms, especially in larger diameter blades, the stresses and strains of the body portion, bound in by the hardened ring thus created, might cause the blade to dish or warp.

Referring now to Fig. 1 it will be noted that when rotated in a clock-wise direction, a tooth 22 will come in contact with a work piece and begin to cut a path or kerf. It will be followed by its trailing paired tooth 20 that has been set to the same side of the blade and will follow substantially the same path. From numerous experiments it has been found that there is obvious coaction between the leading tooth and its trailing paired tooth and between the trailing tooth and the next following leading tooth of the next pair.

This coaction is most noticeable in wattage tests wherein the blade was used for one hundred cuts in each direction and the wattage required to pull the blade through the work piece was measured under a constant speed of pull at the end of each 100 cuts. After each reversal, series of cuts, and test, it was found that the wattage requirements dropped for the first 700 cuts in each direction. After 1400 cuts were made the wattage requirements were actually less than at the commencement of the tests when the cutting points and edges had just been sharpened. This indicated that in each direction the trailing tooth was sharpened as by a honing action by the material being cut as it followed its leading paired tooth through the kerf. The blades of this invention went on to make between 2700 and 3000 cuts before indicating a wattage requirement that rose to a point that might be considered injurious to the motor of the portable electric saw being used. Regular combination blades now on the market were similarly tested and showed a general increase in wattage requirements up to the maximum of 1200 to 1400 cuts where the wattage requirement approached similar possibility of injury to the motor of the portable electric saw being used.

In addition to the honing action and consequent greatly increased life of the blade for cutting purposes before sharpening is required, the blade has a smooth, even-cutting action. Tests and checks indicate that the effect of the trailing tooth, in being extended toward its opposed leading tooth of the following pair, is to prevent a too rapid advancement of the blade into the work piece so that the bite of the next facing or leading cutting tooth of the next pair is not so large that the impact of the tooth with a work piece tends to dull it. The trailing tooth, having the same radius as its paired leading tooth, follows directly in its path and thereby limits the depth of cut and the extent of the next leading tooth to enter the work piece. The normal hammer like blow is reduced to more of a chisel type cutting action. Similarly in ripping it has been found that there is a noticeable lack of kick-back in using the blade of this invention which is apparently due to the limiting effect the trailing tooth has on the depth of cut of the next following cutting tooth.

The trailing tooth also seems to act in the nature of a kerf guide to keep its leading paired tooth in the proper path even though an operator accidentally twists the work piece when used on a table saw, or the saw itself when used on a portable power driven saw. Even though the leading tooth starts to cut off of the normal path by reason of a twist to the work piece or saw, the dull topping and back edges of the following tooth will follow the path of least resistance of the regular kerf and will tend to guide its paired leading tooth and the blade back to its proper path. As a result, the blade of this invention is more easily guided along a desired line.

Since the following tooth receives this honing action and is of the same radius as its leading paired tooth and is set in the same direction, it acts in a further capacity as a raker tooth and seems to clear chips and debris from the path of the next following tooth so that the latter does not have to clear its own path in addition to making its own prelimited new cut. Less chips and dust pile up on the cutting edges to dull and pit them so that the blade life is prolonged.

This blade may be made in any usual manner or the method set forth in my depending application filed on even date herewith may be used.

Modifications of the blade and additional benefits in its use will be apparent to those skilled in the art without departing from the spirit and scope of the invention as claimed.

I claim:

1. A reversible saw blade for use in a power driven saw device, said blade comprising a disc pierced at its center for mounting on an arbor, an even number of pairs of cutting teeth arranged around the rim of said disc, said teeth of each pair of teeth being positioned back to back adjacent each other, to form a cutting tooth and a trailing tooth so that one or other of said teeth is moved in its cutting direction depending on the direction of rotation of the disc, the teeth of each pair defining a cutting arc of equal radius from the center of said disc, and each said tooth presenting the same positive tooth rake with respect to the perimeter of said blade, and both teeth of each pair of teeth being set in the same direction with respect to the disc and the teeth of adjacent pairs being set in opposite directions, whereby said trailing teeth are honed by passage through substantially the same path as the leading tooth, and the depth of cut of the leading tooth of the next pair of teeth is limited to reduce the hazard of kickback.

2. The saw blade of claim 1 in which each of the two teeth of each said pair of teeth has a set placed at a point radially outwardly of said relieved portion and each said tooth hardened at approximately the point where the set of said teeth is placed, whereby said teeth will not lose their set in use.

References Cited in the file of this patent

UNITED STATES PATENTS

| | | |
|---|---|---|
| 87,910 | Clemson | Mar. 16, 1869 |
| 177,481 | Disston | May 16, 1876 |
| 227,815 | Morris | May 18, 1880 |
| 529,538 | Vaugham | Nov. 20, 1894 |
| 571,200 | Oldham | Nov. 10, 1896 |
| 706,447 | Peart | Aug. 5, 1902 |
| 1,531,675 | Mattson | Mar. 31, 1925 |